March 25, 1952  F. P. BENNETT ET AL  2,590,492
SLIDE CHANGING DEVICE FOR STEREOPTICON PROJECTORS
Filed Aug. 17, 1949  4 Sheets-Sheet 1
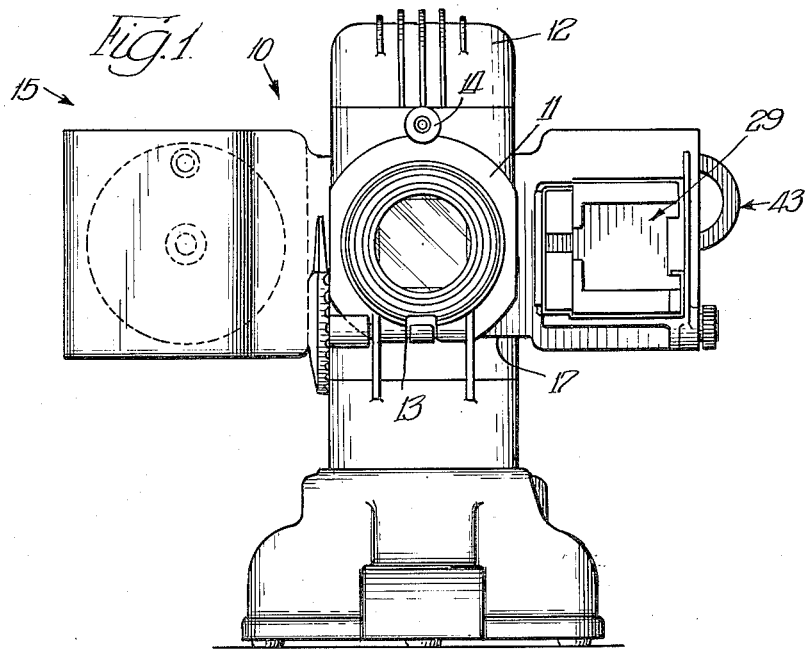
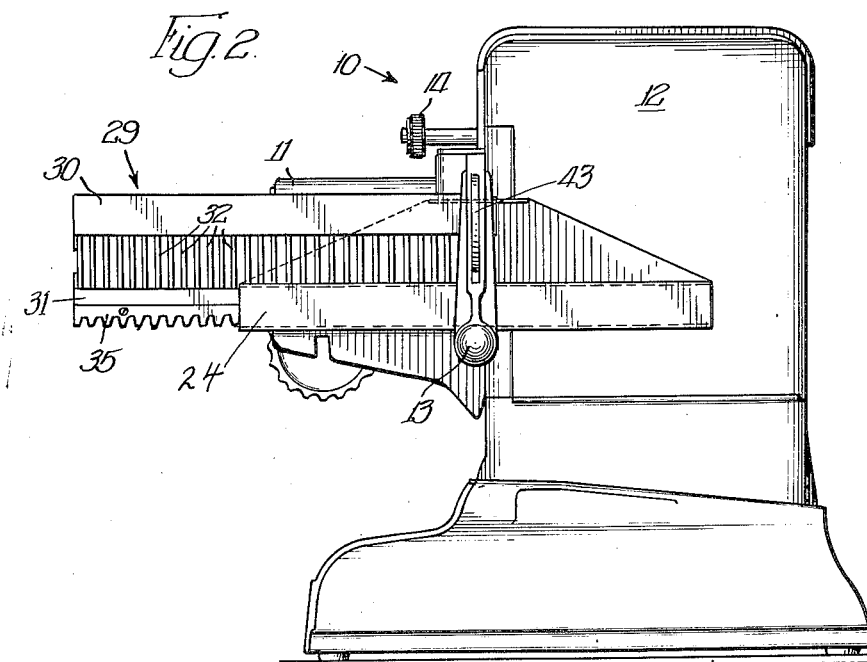
INVENTORS
Frank P. Bennett,
BY Albert E. Webb,
Robert R. Lockwood
Atty.

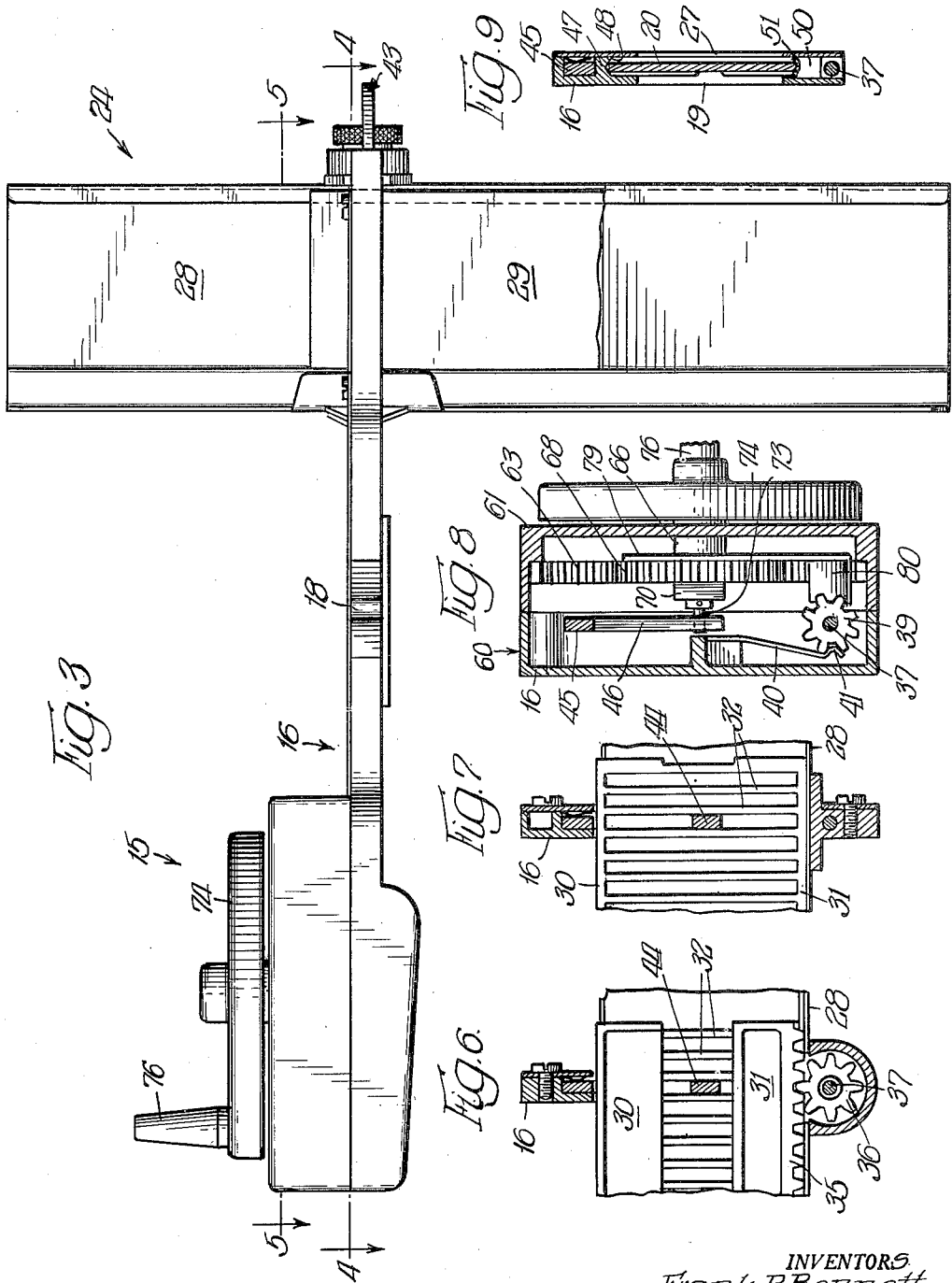

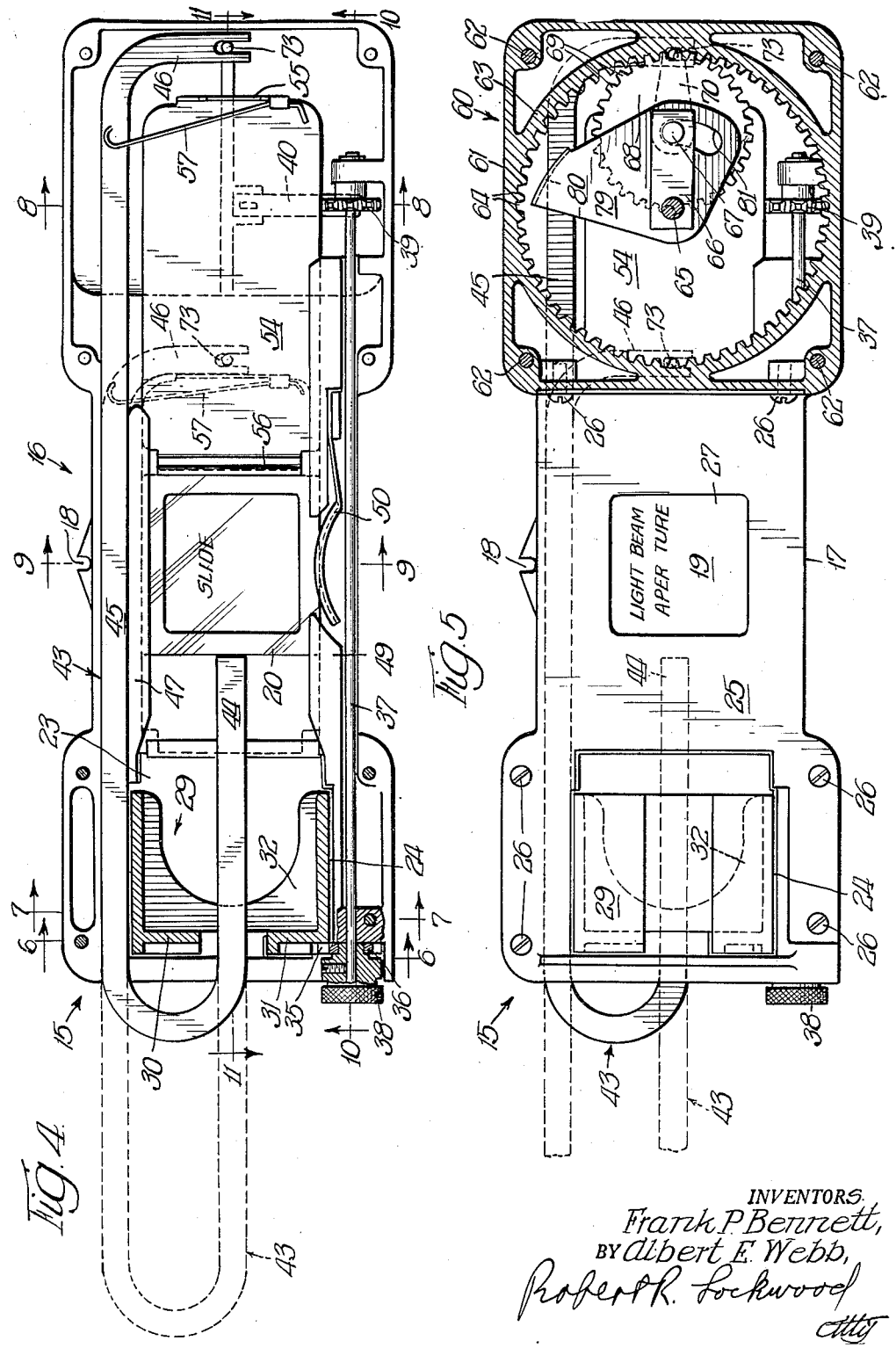

March 25, 1952 F. P. BENNETT ET AL 2,590,492
SLIDE CHANGING DEVICE FOR STEREOPTICON PROJECTORS
Filed Aug. 17, 1949 4 Sheets-Sheet 4
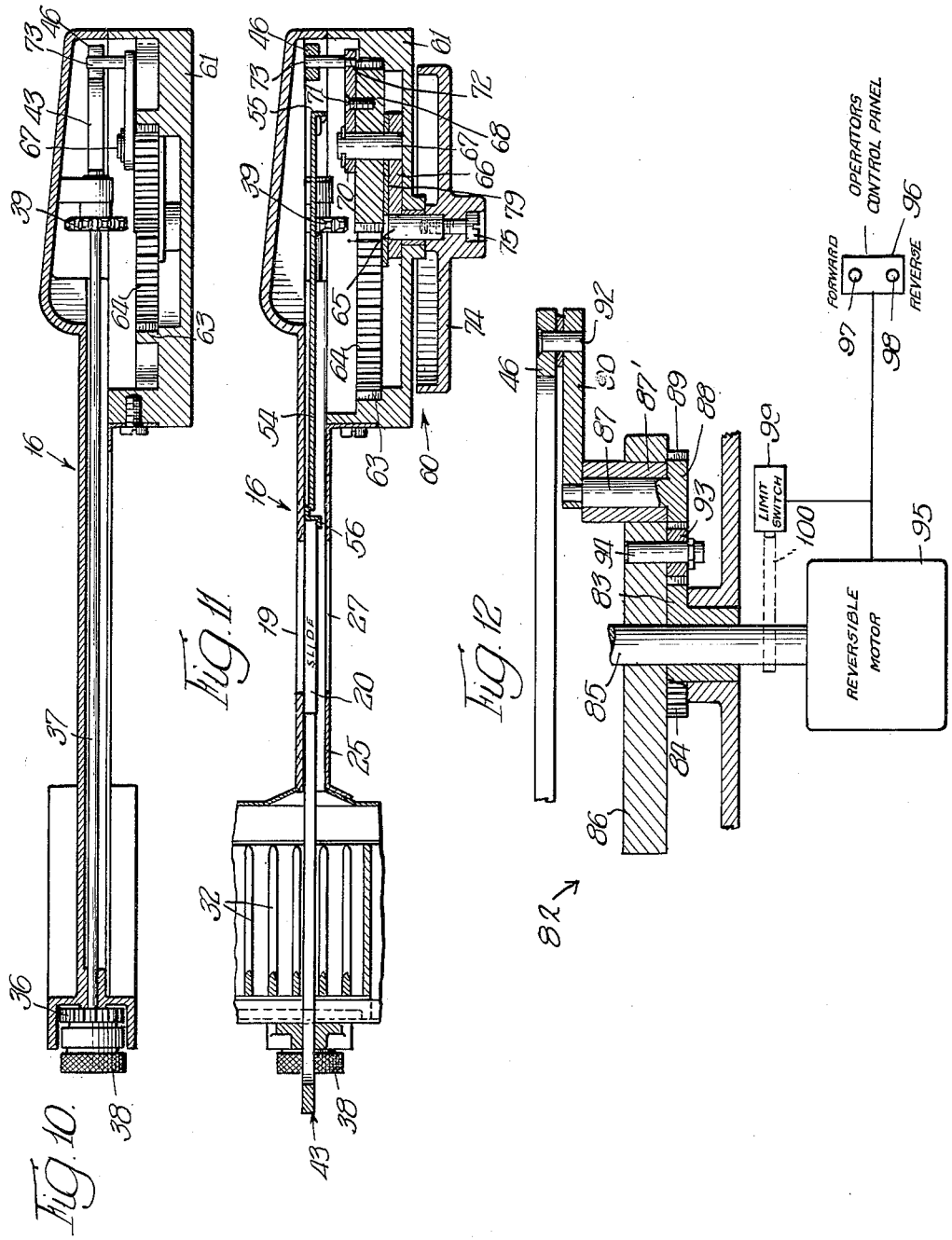
INVENTORS.
Frank P. Bennett,
BY Albert E. Webb,
Robert R. Lockwood
ATTY.

Patented Mar. 25, 1952

2,590,492

UNITED STATES PATENT OFFICE 2,590,492

SLIDE CHANGING DEVICE FOR STEREOPTICON PROJECTORS

Frank P. Bennett, Riverside, and Albert E. Webb, Chicago, Ill., assignors to Three Dimension Company, Chicago, Ill., a corporation of Illinois Application August 17, 1949, Serial No. 110,762

20 Claims. (Cl. 88—28)

1

This invention relates, generally, to stereopticon projectors and it has particular relation to slide changers therefor.

Among the objects of this invention are: To change slides in a stereopticon projector in a new and improved manner; to shift the slides sequentially from and to a slide storage tray into and out of operative position in the projector; to change the slides in either a forward or a reverse sequence; to shift a slide from the slide storage tray to operative position in the projector and then to return it to the same position in the tray, thereafter bodily moving the tray to place the next slide in position to be shifted as set forth; to hold the storage tray in any position to which it may be operated while permitting it to be shifted manually on application of sufficient force to overcome the holding means; to intercept the light beam of the projector either by a slide or an opaque shutter so as to prevent the beam from impinging on the screen at full intensity; to center the slides of slightly varying height in the light beam; to operate the slide changer by a member having a translatory movement produced by a member having a rotary movement; to move the slide tray periodically by the member having the rotary movement; to produce the translatory movement by rotating an arm by a rotatable driving member through a planetary gear system; to control the operation of the slide changer from a remote point; to stop the slide changer automatically when the next slide has been placed in operative position in the projector; and to reverse from a remote point the sequence in which the slides are shown.

Other objects of this invention will, in part, be obvious and in part appear hereinafter.

This invention is disclosed in the embodiments thereof shown in the accompanying drawings, and it comprises the features of construction, combination of elements and arrangement of parts which will be exemplified in the construction hereinafter set forth and the scope of the application of which will be indicated in the appended claims.

For a more complete understanding of the nature and scope of this invention, reference can be had to the following detailed description, taken together with the accompanying drawings, in which:

Figure 1 is a view, in front elevation, of a conventional form of stereopticon projector having mounted thereon a slide changer constructed in accordance with the present invention;

Figure 2 is a view in side elevation of the mechanism shown in Figure 1;

2

Figure 3 is a top plan view of the slide changing device;

Figures 4 and 5 are detail sectional views taken generally along the lines 4—4 and 5—5 of Figure 3;

Figures 6, 7, 8, and 9 are detail sectional views taken, respectively, along the lines 6—6, 7—7, 8—8, and 9—9 of Figure 4;

Figures 10 and 11 are detail sectional views taken generally along the lines 10—10 and 11—11, respectively, of Figure 4; and Figure 12 illustrates diagrammatically an alternate form of driving mechanism and shows how the slide changer of the present invention can be controlled from a remote point through the agency of a reversible motor.

Referring now particularly to Figures 1 and 2 of the drawings, it will be observed that the reference character 10 designates a stereopticon projector which may be of conventional construction the details of which form no part of the present invention. The projector 10 includes an optical system 11 and a lamp housing 12. The optical system 11 may be hinged at 13 on the lamp housing 12 and a retaining screw 14 may be provided for holding the optical system 11 in position. This construction is conventional and is employed for the purpose of permitting the insertion of a slide changer of conventional design between the optical system 11 and lamp housing 12. In accordance with the present invention a slide changer, shown generally at 15, may be positioned on the lamp housing 12 and between it and the optical system 11.

As illustrated more clearly in Figures 3, 4 and 5 of the drawings, the slide changer 15 includes an elongated generally rectangular metallic frame 16 having a central lower edge or face 17 which is arranged to rest on a suitable shelf extending from the lamp housing 12. Centrally located along its upper edge the frame 16 is provided with a slot 18 through which the screw 14 extends. This construction permits the frame 16 of the slide changer 15 to be held firmly in place on the lamp housing 12. A light beam aperture 19, Figure 5, is provided centrally of the frame 16 with which a slide 20, Figure 4, is arranged to register in conventional manner for intercepting the light beam to permit the picture or the like contained by the slide to be thrown on a screen. It will be understood that the light beam aperture 19 is aligned with the optical system 11 of the projector 10.

As shown in Figure 4, the frame 16 has a rectangular opening 23 at its left hand end in which is positioned a slide tray holder 24 that extends at right angles to the frame 16 and generally parallel to the light beam through the aperture 19 and the optical system 11. The slide tray holder 24 may be secured in position by a cover plate 25 which is welded thereto. Screws 26, which extend through the cover plate 25 and into the frame 16, serve to hold it and the slide tray holder 24 in fixed position. As shown in Figure 11 more clearly, the cover plate 25 has a light beam aperture 27 which registers with the corresponding aperture 19 in the frame 16. It will be understood that the slide 20 is positioned in operative position in the projector 10 between the apertures 19 and 27.

The slide tray holder 24 has a floor 28 along which a slide tray, shown generally at 29 in Figures 2 and 5, can slide. The slide tray 29 is provided for holding a stack of slides 20, for example, a stack of thirty slides, in parallel relation to each other for sequential movement into and out of operative position in the projector 10.

The slide tray 29, which may be formed of any suitable material such as a phenolic condensation product, resin, metal, etc., may include upper and lower frame members 30 and 31 which support generally U-shaped dividers 32 in spaced relation for receiving the slides 20 therebetween. It will be understood that the slides 20 may be positioned in the slide tray 29 in the order in which it is wished to show them and that the slide tray 29 may be employed as a permanent storage therefor. After the slides in one slide tray 29 have been shown, in a manner to be described hereinafter, another similar tray 29 can be positioned on the holder 24 and, thereafter, they can be shown. Once the slides have been placed in the slide tray 29 in the desired sequence, it is unnecessary to handle them individually either for projecting or storage purposes.

After each slide 20 has been shown and returned to the slide tray 29, the latter is moved in order to bring the next slide to be shown into position where it can be moved into operative position in the projector 10. The means for accomplishing this in the desired timed relationship will be described hereinafter. In order to move the slide tray 29 it may be provided with a rack 35, Figure 6, along the underside of the lower frame member 31 and this rack 35 may be driven by a pinion 36 which is fast on a drive shaft 37. The drive shaft 37 is journaled in the elongated frame 16 and at the end adjacent the pinion 36 a knurled knob 38 is fastened to facilitate manual rotation of the shaft 37 and corresponding movement of the slide tray 29. At its other end the shaft 37 is provided with a driving pinion 39 which is shown more clearly in Figures 4 and 8 of the drawings. Provision is made, as will be set forth hereinafter, for rotating the driving pinion 39 through a limited extent each time that a slide 20 is returned to the slide tray 29 for advancing the latter to the next position. Since it is desirable to hold the slide tray 29 in any position to which it may be operated, provision is made for holding the driving shaft 37 in any position to which it is operated. For this purpose a leaf spring 40 may be employed one end of which is secured to the frame 16 and the other end 41 is deformed so as to provide a detent which, as shown in Figure 8, interfits with the space between adjacent teeth of the driving pinion 39 and serves to hold the same stationary. Because of the resiliency of the leaf spring 40, the detent portion 41 is moved out of this space when sufficient torque is applied to the driving pinion 39 or to the drive shaft 37 for accomplishing such rotation.

As illustrated in Figure 4 of the drawings a yoke, shown generally at 43, is employed for moving the slide 20 from the slide tray 29 into registry with the light beam openings 19 and 27 in the frame 16 and cover plate 25, respectively. The yoke 43 includes an end portion 44 which, as shown, is arranged to engage the left hand side of each slide 20. As shown in Figures 6 and 7 of the drawings, this end portion 44 is arranged to move between adjacent dividers 32 of the slide tray 29 so as to move the slide 20 out of position therebetween. The yoke 43 also has a central portion 45 which is parallel to the end portion 44 and at its other end it has a fork or attaching portion 46 which, as will be described hereinafter, is arranged to be moved back and forth with a translatory movement. The central portion 45 of the yoke 43 is guided on a ledge 47, Figure 9, which may be formed integrally with the frame 16. It will be observed that the underside of the ledge 47 is grooved as indicated at 48. The purpose of this is to center the slide 20 longitudinally of the light beam generally without regard to the thickness of the slide.

As shown in Figure 4 the bottom of the slide 20 may be guided by a grooved ledge 49 into operative position in the projector 10. It is desirable to locate each slide 20 laterally of the light beam in the same position. Since their widths may vary slightly, provision is made to accomplish this by a leaf spring 50, Figures 4 and 9, which may be secured at one end to the frame 16 in any suitable manner. The leaf spring 50 has a grooved upper surface 51 which faces the groove 49 in the ledge 47. Because of the groove 51 in the spring 50 the lower edge of the slide 20 is properly centered longitudinally of the light beam and, because of the resiliency of the spring 50, the upper edge of the slide 20 is held in engagement with the groove 48 in the upper ledge 47.

The slide 20 is moved out of operative position in the projector 10 by a rigid member or shutter 54 which not only accomplishes this function but also completely closes the light beam apertures 19 and 27 in the absence of a slide 20. As shown in Figure 4 the rigid member or shutter 54 is moved to the right when the slide 20 is moved in this direction by the yoke 43 by engagement of the right hand side of the slide with the left hand end of the shutter 54. At its right end the shutter 54 has an outstanding flange 55 to provide an abutment for engagement by the fork 46 of the yoke 43 for the purpose of moving the shutter 54 to the left and therewith the slide 20 back to its original position in the slide tray 29. At its left end the shutter 54 is provided with a ledge 56, Figure 11, which overlies the adjacent edge of the slide 20. The purpose of the ledge 56 is to close off the space along the edge of the slide 20 so that there is no possibility of any light escaping along this edge and being thrown directly on the screen.

At the end of the stroke of the shutter 54 which moves the slide 20 back into position in the slide tray 29, it is desirable that the shutter 54 be withdrawn slightly so that its left hand end will be out of the path of the next slide and will permit the slide tray 29 to be shifted so as to place the next slide in position to be moved into operative position in the projector 10. For this purpose a spring finger 57 may be provided at the right hand end of the shutter 54 as shown in Figure 4, The lower end of the spring finger 57 is fastened to the shutter 54, as shown, and the upper end is free and, as shown by the broken lines, is arranged to engage the right hand end of the ledge 47. As soon as the fork 46 moves away from its broken line position shown in Figure 4 to the right, the spring 57 acts to bias the shutter 54 a slight distance to the right through an extent sufficient to move its left hand end out of the path of the slides 20 in the slide tray 29.

The mechanism for reciprocating the yoke 43 to move the slide 20 into and out of operative position in the projector 10 and for periodically rotating the drive shaft 37 to advance the slide tray 29 to the next position will now be described. The mechanism for accomplishing this is indicated generally at 60 in Figures 5 and 11 of the drawings at the right hand end of the frame 16. It includes a generally rectangular housing 61 which may be secured to the frame 16 by suitable screws 62. Integrally formed with the housing 61 is a stationary ring gear 63 having teeth 64 the pitch circle of which has its center coinciding with the axis of rotation of a rotatable shaft 65 which, as shown in Figure 11, is journaled in the housing 61. Fast on the shaft 65 is a support or arm 66 which carries a stud 67 parallel to the shaft 65 at a position half way between the axis of rotation of the shaft 65 and the pitch circle of the teeth 64. Rotatably mounted on the stud 67 is a planetary gear 68 having teeth 69 the pitch circle of which has a diameter which equals the radius of the pitch circle of the teeth 64. The teeth 69 of the planetary gear 68 are in mesh with the teeth 64 of the stationary ring gear 63. Because of the arrangement just described, when the shaft 65 is rotated the support or arm 66 is rotated and, since the teeth 69 of the planetary gear 68 engage the teeth 64 of the ring gear 63, the planetary gear 68 is rotated. Now it can be shown that there is a point on the planetary gear 68 which will travel in a straight line when the shaft 65 is rotated as just described. Advantage is taken of this by providing an arm 70 and fastening it by a screw 71 to the planetary gear 68 in such position that the arm 70 extends in the same direction as does the arm 66. The stud 67 may project through the arm 70 to prevent it from turning relative to the planetary gear 68. The point referred to having a translatory motion is indicated at 72 and, in the relative position of the parts shown in Figure 11, the point 72 lies along the pitch circle of the teeth 64 of the stationary ring gear 63. Also the point 72 coincides with the pitch circle of the teeth 69 of the planetary gear 68. Since the point 72 has a translatory motion, a pin 73 may be provided thereat in the arm 70, as shown, and it has operative engagement with the fork or attaching portion 46 of the yoke 43 and serves to reciprocate the same in the manner described for moving the slide 20 into and out of operative position in the projector 10.

Any suitable means can be employed for rotating the shaft 65. As described hereinafter, it may be driven by a motor which may be controlled from a remote point. In the construction shown in Figure 11 a disc 74 is mounted on the outer end of the shaft 65 and is secured thereto by a screw 75. A handle 76, Figure 3, projects from the disc 74 to facilitate its manual rotation.

The driving pinion 39 and drive shaft 37 are rotated intermittently to move the slide tray 29 to the next position. For this purpose an indexing cam 79 is provided as illustrated in Figures 5 and 11. The indexing cam 79 is generally sector shaped and is loosely mounted on the shaft 65. It has a cam portion 80, Figure 8, which is arranged to engage one of the teeth of the driving pinion 39 for the purpose of advancing it through one tooth pitch for each rotation of the indexing cam 79. Either the upper or the lower surface of the cam portion 80 engages one of the teeth of the driving pinion 39 depending upon the direction in which the indexing cam 79 is rotated. As shown in Figure 5 the indexing cam 79 has an arcuate slot 81 through which the stud 67 projects. Driving connection with the indexing cam 69 is established when the stud 67 engages one or the other end of the arcuate slot 81. The purpose of the slot 81 is to provide the same phase relation of lost motion between the indexing or movement of the slide tray 29 and the movement of the slide 20 back into the slide tray 29 for either direction of rotation of the shaft 65. This construction permits the slides 20 to be shown in either a forward or a reverse sequence as desired.

In Figure 12 of the drawings there is illustrated, generally, at 82 a modified form of operating mechanism for producing the translatory movement of the yoke 43. The operating mechanism 82 includes a stationary spur gear 83 having outwardly extending teeth 84 the center of whose pitch circle is the axis of rotation of a rotatable shaft 85 which corresponds to the shaft 65 previously described. The spur gear 83 corresponds to the ring gear 63 shown in Figure 5. Fast on the shaft 85 is a support or disc 86 which carries a stud 87 that is rotatably mounted thereon by a suitable bearing 87'. Fast on the stud 87 is a planetary gear 88, corresponding to the planetary gear 68 of the operating mechanism 60, which has teeth 89. Also fast on the stud 87 is an arm 90 which carries a pin 92 for engaging the fork or attaching portion 46 of the yoke 43. When the arm 90 extends in the same direction as the portion of the support or disc 86 between the shaft 85 and the stud 87, the pin 92 is located at a distance from the axis of rotation of the shaft 85 which is twice the distance between this axis and the axis of rotation of the stud 87. The planetary gear 88 is rotated when the shaft 85 is rotated through the agency of an idler pinion 93 which is rotatably mounted on a stud 94 that is carried by the support or disc 86. It will be observed that the teeth of the idler pinion 93 engage the teeth 84 of the stationary spur gear 83 and the teeth 89 of the planetary gear 88.

When the operating mechanism 82, constructed as just described, is employed and the shaft 85 is rotated, the pin 92 has a translatory movement and serves to reciprocate the yoke 43. It will be understood that the indexing cam 79 or an equivalent device can be mounted on the shaft 85 for intermittently rotating the drive shaft 37 to move the slide tray 29 to the next position.

Any suitable means can be provided for rotating the shaft 85. For example, the manual means comprising the disc 74 and handle 76 can be mounted thereon. As shown in Figure 12 the shaft 85 is arranged to be driven by a reversible electric motor 95. If desired the drive may be direct or there may be a suitable gear reduction as desired.

When the electric motor 95 is employed for operating the slide changer it is possible to control it from a remote point, such as a speaker's position adjacent the screen, and thus provide at this point complete control of the showing of the slides. For this purpose a control station 96 may be provided at the remote point having a forward push button 97 and a reverse push button 98. In order to deenergize the reversible motor 95 when the next slide has been placed in position a limit switch 99 may be provided which is operated by a parking cam 100 that may be driven by the shaft 85. The parking cam 100 is indicated by the broken lines in Figure 12 as providing a mechanical connection between the shaft 85 and the limit switch 99 for the purpose specified. It will be understood that the reversible motor 95 can be employed in lieu of the disc 74 for operating the slide changer 15 described hereinbefore and shown in Figures 1 through 11.

Since certain further changes can be made in the foregoing constructions and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. A slide changing device for a stereopticon projector having light beam projecting means comprising, in combination, a tray for storing a plurality of slides in parallel juxtaposed position, mounting means on said device for supporting said tray parallel and to one side of said light beam, shutter means on said device movable horizontally across said light beam, an operating member separate and distinct from said shutter means, guide means on said device directing said operating member for horizontal movement, and a rigid member transmitting the horizontal movement of said operating member in opposite horizontal directions thereby to apply forces in opposite directions to the slide in said tray in alignment with said shutter means to move said slide horizontally out of said tray into registry with said light beam and then back into said tray, said slide moving said shutter means out of registry with said light beam on movement out of said tray and being accompanied by movement of said shutter into registry with said light beam on movement of said slide back into said tray.

2. A device for changing slides supported in a stack extending in parallel spaced relation to one side of the light beam of a stereopticon projector comprising, in combination, shutter means horizontally slidably mounted on said device for movement across said light beam in substantially the same path that a slide moves thereacross to operative position, an operating member separate and distinct from said shutter means, guide means on said device directing said operating member for horizontal movement, and a rigid member transmitting the horizontal movement of said operating member in opposite horizontal directions thereby to apply forces in opposite directions to said slide to move the same horizontally out of said stack into registry with said light beam and then back into said stack, said slide pushing said shutter means out of registry with said light beam on movement out of said stack on forward movement of said operating member, reverse movement of said operating member effecting movement of said shutter means into registry with said light beam.

3. A device for changing slides supported in a stack extending in parallel spaced relation to one side of the light beam of a stereopticon projector comprising, in combination, shutter means horizontally slidably mounted on said device for movement across said light beam in substantially the same path that a slide moves thereacross to operative position, an operating member separate and distinct from said shutter means, guide means on said device directing said operating member for horizontal movement, a rigid member transmitting the horizontal movement of said operating member in opposite horizontal directions thereby to apply forces in opposite directions to said slide to move the same horizontally out of said stack into registry with said light beam and then back into said stack, said slide pushing said shutter means out of registry with said light beam on movement out of said stack on forward movement of said operating member, reverse movement of said operating member effecting movement of said shutter means into registry with said light beam, mechanism on said device for bodily moving said stack of slides to locate the next slide in position where it can be moved as aforesaid, and operating means for said mechanism mechanically interlocked with said operating member to function in timed relation therewith for operating said mechanism when a slide has been returned to said stack and said shutter intercepts said light beam.

4. A device for changing slides supported in parallel relation in a tray along one side of a light beam of a stereopticon projector comprising, in combination, a frame for extending horizontally and transversely of said light beam having an aperture therein for the same, a tray holder extending at right angles to one end of said frame for slidably supporting said tray, an operating member, guide means on said device directing said operating member for horizontal movement endwise of said frame, a rigid member transmitting the horizontal movement of said operating member in opposite horizontal directions thereby to apply forces in opposite directions to the slides in said tray one by one to move the same horizontally therefrom into and out of said light beam by force exerted through said operating member, and shutter means separate and distinct from said operating member and horizontally slidable endwise of said frame for intercepting said light beam in the absence of a slide, said shutter means being engageable by a slide as the same is moved out of said tray on forward movement of said operating member whereby said shutter means is moved out of said light beam when a slide is moved into the same, reverse movement of said operating member being accompanied by return of said shutter means into registry with said light beam.

5. A device for changing slides supported in parallel relation alongside a light beam of a stereopticon projector in a tray provided with a lengthwise rack comprising, in combination, a frame for extending transversely of said light beam having an aperture therein for the same, a shutter slidably mounted on said frame for closing said aperture in the absence of a slide, a tray holder extending at right angles to said frame for slidably supporting said tray, reversible operating mechanism on said frame, interconnecting means separate and distinct from said shutter and carried by said frame and operatively engaging said slides one by one and said operating mechanism to move the former into and out of and said shutter respectively out of and into registry with said aperture to intercept said light beam when said operating mechanism is energized, pinion means rotatably mounted on said frame for engaging said rack on said tray, and driving means connected to said operating mechanism intermittently engaging said pinion means to move said tray on return of a slide thereto along said tray holder in a forward or reverse direction depending upon the direction in which said operating mechanism is operated to place the next slide in position for movement as aforesaid whereby the slides can be shown in a forward or a reverse sequence.

6. A device for changing slides supported in parallel relation alongside a light beam of a stereopticon projector in a tray provided with a lengthwise rack comprising, in combination, a frame for extending horizontally transversely of said light beam having an aperture therein for the same, a tray holder extending at right angles to said frame for slidably supporting said tray, a driving member on said frame movable endwise thereof, a yoke slidable endwise of said frame and operatively connected to said driving member and arranged to engage the outer side of said slides one by one to push the same from said tray into registry with said aperture to intercept said light beam, shutter means slidable endwise of said frame for intercepting said light beam in the absence of a slide, said shutter means being engageable on one side by a slide as it is moved into said light beam whereby the former is moved out of registry therewith and engageable on the other side by said yoke to push said slide back into said tray and to cover said aperture in the absence of a slide, pinion means rotatably mounted on said frame for engaging said rack on said tray, and means intermittently operatively interconnecting said driving member and said pinion for driving said tray to move the next slide into position to be acted upon by said yoke and shutter means as aforesaid.

7. A device for changing slides supported in parallel relation alongside a light beam of a stereopticon projector in a tray provided with a lengthwise rack comprising, in combination, a frame for extending horizontally transversely of said light beam having an aperture therein for the same, a tray holder extending at right angles to said frame for slidably supporting said tray, a driving member on said frame movable endwise thereof, a yoke slidable endwise of said frame and operatively connected to said driving member and arranged to engage the outer side of said slides one by one to push the same from said tray into registry with said aperture to intercept said light beam, shutter means slidable endwise of said frame for intercepting said light beam in the absence of a slide, said shutter means being engageable on one side by a slide as it is moved into said light beam whereby the former is moved out of registry therewith and engageable on the other side by said yoke to push said slide back into said tray and to cover said aperture in the absence of a slide, pinion means rotatably mounted on said frame for engaging said rack on said tray, means intermittently operatively interconnecting said driving member and said pinion for driving said tray to move the next slide into position to be acted upon by said yoke and shutter means as aforesaid, and spring pressed detent means cooperating with said pinion means to hold the same in any position to which it may be operated whereby said tray is held in position to permit said yoke and shutter means to move the corresponding slide into and out of operative position.

8. A device for changing slides supported in parallel relation in a tray alongside a light beam of a stereopticon projector comprising, in combination, a frame for extending transversely of said light beam having an aperture therein for the same, a tray holder extending at right angles to one end of said frame for slidably supporting said tray; mechanism at the other end of said frame including a rotatable shaft and means for driving the same, a stationary gear on said frame having the pitch circle of its teeth concentric with said shaft, a support fast on said shaft, a planetary gear rotatably mounted on said support and having driving connection with said stationary gear, and an arm rotatable with said planetary gear; a yoke slidable endwise in said frame and operatively connected to said arm at a point whose distance from the axis of rotation of said planetary gear is equal to the distance between said axis and the axis of rotation of said shaft whereby said point has a translatory movement and said yoke is reciprocated from a given position back to the same on one complete rotation of said shaft, said yoke being arranged to engage the outer side of said slides one by one to push the same from said tray into registry with said aperture to intercept said light beam, and a rigid member slidable endwise of said frame and operatively connected to said arm for engaging the inner side of said slides to push the same back into said tray.

9. The invention, as set forth in claim 8, wherein the stationary gear is a ring gear and the diameter of the pitch circle of the teeth of the planetary gear is one half the diameter of the pitch circle of the teeth of said ring gear.

10. The invention, as set forth in claim 8, wherein the stationary gear is a spur gear and the pitch circle of its teeth is within the circular path of the axis of rotation of the planetary gear.

11. The invention, as set forth in claim 8, wherein the driving means for the rotatable shaft is a reversible electric motor, remotely operable means is provided for energizing said motor to rotate in either direction, and means driven thereby are provided for deenergizing the same when the next slide has been moved into registry with the aperture in the frame in either a forward or a reverse sequence.

12. A device for changing slides supported in parallel relation in a tray alongside a light beam of a stereopticon projector comprising, in combination, a frame for extending transversely of said light beam having an aperture therein for the same, a tray holder extending at right angles to one end of said frame for slidably supporting said tray; mechanism at the other end of said frame including a rotatably shaft and means for driving the same, a stationary gear on said frame having the pitch circle of its teeth concentric with said shaft, a support fast on said shaft, a planetary gear rotatably mounted on said support and having driving connection with said stationary gear, and an arm rotatable with said planetary gear; a yoke slidable endwise in said frame and operatively connected to said arm at a point whose distance from the axis of rotation of said planetary gear is equal to the distance between said axis and the axis of rotation of said shaft whereby said point has a translatory movement and said yoke is reciprocated from a given position back to the same on one complete rotation of said shaft, said yoke being arranged to engage the outer side of said slides one by one to push the same from said tray into registry with said aperture to intercept said light beam, a rigid member slidable endwise of said frame and operatively connected to said arm for engaging the inner side of said slides to push the same back into said tray, a drive shaft rotatably mounted on said frame and means for placing the same in driving connection with said tray, and operating means intermittently interconnecting said shafts whereby for each revolution of the first mentioned shaft said tray is moved to position the next slide for subsequent movement by said yoke and rigid member as aforesaid.

13. A device for changing slides supported in parallel relation in a tray alongside a light beam of a stereopticon projector comprising, in combination, a frame for extending transversely of said light beam having an aperture therein for the same, a tray holder extending at right angles to one end of said frame for slidably supporting said tray; mechanism at the other end of said frame including a rotatable shaft and means for driving the same, a stationary gear on said frame having the pitch circle of its teeth concentric with said shaft, a support fast on said shaft, a planetary gear rotatably mounted on said support and having driving connection with said stationary gear, and an arm rotatable with said planetary gear; a yoke slidable endwise in said frame and operatively connected to said arm at a point whose distance from the axis of rotation of said planetary gear is equal to the distance between said axis and the axis of rotation of said shaft whereby said point has a translatory movement and said yoke is reciprocated from a given position back to the same on one complete rotation of said shaft, said yoke being arranged to engage the outer side of said slides one by one to push the same from said tray into registry with said aperture to intercept said light beam, a rigid member slidable endwise of said frame and operatively connected to said arm for engaging the inner side of said slides to push the same back into said tray, a drive shaft rotatably mounted on said frame and means for placing the same in driving connection with said tray, a gear fast on said drive shaft, and an indexing cam rotatable with the first mentioned shaft and arranged for each revolution thereof to engage said gear on said drive shaft and rotate the same sufficiently to move said tray to position the next slide for subsequent movement by said yoke and rigid member as aforesaid.

14. The invention, as set forth in claim 13, wherein there is lost motion between the cam and the shaft driving the same whereby the same phase relation is maintained between the movement of the yoke and rigid member out of the path of the slides and the movement of the tray to the next position for either direction of rotation of said shaft.

15. A device for changing slides supported in parallel relation in a tray along one side of a light beam of a stereopticon projector comprising, in combination, a frame for extending horizontally and transversely of said light beam having an aperture therein for the same, a tray holder extending at right angles to one end of said frame for slidably supporting said tray, an operating member horizontally slidable endwise of said frame for cooperating with the slides in said tray one by one to move the same horizontally therefrom into and out of said light beam by force exerted through said operating member, shutter means separate and distinct from said operating member and horizontally slidable endwise of said frame for intercepting said light beam in the absence of a slide, said shutter means being engageable by a slide as the same is moved out of said tray on forward movement of said operating member whereby said shutter means is moved out of said light beam when a slide is moved into the same, reverse movement of said operating member being accompanied by return of said shutter means into registry with said light beam, grooved ledges on said frame above and below said aperture one of which is movable toward the other, and spring means biasing said movable grooved ledge toward the other to hold a slide in predetermined position with respect to said light beam aperture.

16. A device for changing slides supported in parallel relation in a tray along one side of a light beam of a stereopticon projector comprising, in combination, a frame for extending horizontally and transversely of said light beam having an aperture therein for the same, a tray holder extending at right angles to one end of said frame for slidably supporting said tray, an operating member horizontally slidable endwise of said frame for cooperating with the slides in said tray one by one to move the same horizontally therefrom into and out of said light beam by force exerted through said operating member, shutter means separate and distinct from said operating member and horizontally slidable endwise of said frame for intercepting said light beam in the absence of a slide, said shutter means being engageable by a slide as the same is moved out of said tray on forward movement of said operating member whereby said shutter means is moved out of said light beam when a slide is moved into the same, reverse movement of said operating member being accompanied by return of said shutter means into registry with said light beam, and a ledge along the edge of said shutter means that engages a slide for overlapping the juxtaposed edge thereof whereby no light rays are permitted to pass along said edge.

17. A device for changing slides supported in parallel relation alongside a light beam of a stereopticon projector in a tray provided with a lengthwise rack comprising, in combination, a frame for extending horizontally transversely of said light beam having an aperture therein for the same, a tray holder extending at right angles to said frame for slidably supporting said tray, a driving member on said frame movable endwise thereof, a yoke slidable endwise of said frame and operatively connected to said driving member and arranged to engage the outer side of said slides one by one to push the same from said tray into registry with said aperture to intercept said light beam, shutter means slidable endwise of said frame for intercepting said light beam in the absence of a slide, said shutter means being engageable on one side by a slide as it is moved into said light beam whereby the former is moved out of registry therewith and engageable on the other side by said yoke to push said slide back into said tray and to cover said aperture in the absence of a slide, pinion means rotatably mounted on said frame for engaging said rack on said tray, means connected to said pinion for rotating the same to drive said tray and move the next slide into position to be acted upon by said yoke and shutter means as aforesaid, and spring pressed detent means cooperating with said pinion means to hold the same in any position to which it may be operated whereby said tray is held in position to permit said yoke and shutter means to move the corresponding slide into and out of operative position.

18. In a device for moving a slide into and out of registry with a light beam of a stereopticon projector, in combination, a frame for extending transversely of said light beam having an aperture therefor intermediate its ends and a slide receiving portion at one end, operating mechanism at the other end of said frame including a driving member movable endwise thereof, a yoke slidable endwise of said frame and operatively connected to said driving member and arranged to engage the outer side of the slide in said receiving portion to push the same into registry with said aperture to intercept said light beam, a rigid member slidable endwise of said frame and separate and distinct from and operatively connected to said driving member for engaging the inner side of said slide to push the same back into said receiving portion, and spring means cooperating with said rigid member at the end of its working stroke to move the same out of engagement with said slide.

19. A device for changing slides supported in parallel relation in a tray alongside a light beam of a stereopticon projector comprising, in combination, a frame for extending transversely of said light beam having an aperture therein for the same, a tray holder extending at right angles to one end of said frame for slidably supporting said tray, operating mechanism at the other end of said frame including a driving member movable endwise thereof, a yoke slidable endwise of said frame and operatively connected to said driving member and arranged to engage the outer side of said slides one by one to push the same from said tray into registry with said aperture to intercept said light beam, a shutter slidable endwise of said frame and separate and distinct from and arranged to be engaged on the outer side by said yoke for engaging by its inner side the inner side of said slides to push the same back into said tray and to cover said aperture in the absence of a slide, said shutter remaining over said aperture on the continued operation of said driving member and movement of said yoke in the absence of a slide, and means operatively interconnecting said driving member and said tray to move the latter and thereby the next slide into position to be acted upon by said yoke and said shutter as aforesaid.

20. A device for inserting and removing a slide in and from a light beam of a stereopticon projector comprising, in combination, a frame for extending transversely of said light beam having an aperture therein for the same, slide holding means at one end of said frame, operating means at the other end of said frame including a driving member movable endwise thereof, a yoke slidable endwise of said frame and operatively connected to said driving member and arranged to engage the outer side of a slide in said slide holding means to push the same therefrom into registry with said aperture to intercept said light beam, and a shutter slidable endwise of said frame and separate and distinct from and arranged to be engaged on the outer side by said yoke for engaging by its inner side the inner side of said slide to push the same back into said slide holding means and to cover said aperture in the absence of a slide, said shutter remaining over said aperture on the continued operation of said driving member and movement of said yoke in the absence of a slide.

FRANK P. BENNETT.
ALBERT E. WEBB.

REFERENCES CITED

The following references are of record in the file of this patent:

UNITED STATES PATENTS

| Number | Name | Date |
| --- | --- | --- |
| 594,819 | Allen | Nov. 30, 1897 |
| 634,194 | Woodward | Oct. 3, 1899 |
| 998,305 | Roebuck | July 18, 1911 |
| 1,069,521 | Bernard | Aug. 5, 1913 |
| 1,307,474 | Baldwin et al. | June 24, 1919 |
| 1,402,791 | Petherick | Jan. 10, 1922 |
| 2,260,660 | Darwin | Oct. 28, 1941 |
| 2,298,369 | Greaves | Oct. 13, 1942 |
| 2,298,413 | Reid | Oct. 13, 1942 |
| 2,427,164 | Stechbart | Sept. 9, 1947 |
| 2,460,359 | Page | Feb. 1, 1949 |
| 2,464,214 | Cochran | Mar. 15, 1949 |
| 2,522,760 | Lowber et al. | Sept. 19, 1950 |

FOREIGN PATENTS

| Number | Country | Date |
| --- | --- | --- |
| 3,867 | France | Jan. 12, 1905 |

(First addition to 340,931)